US009710986B2

(12) United States Patent
Tabata

(10) Patent No.: US 9,710,986 B2
(45) Date of Patent: Jul. 18, 2017

(54) VEHICLE DOOR HANDLE DEVICE

(71) Applicant: Aisin Seiki Kabushiki Kaisha, Kariya-shi (JP)

(72) Inventor: Takehiro Tabata, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/131,053

(22) Filed: Apr. 18, 2016

(65) Prior Publication Data

US 2016/0371909 A1 Dec. 22, 2016

(30) Foreign Application Priority Data

Jun. 19, 2015 (JP) ................. 2015-123576

(51) Int. Cl.
| G07C 9/00 | (2006.01) |
| B60R 25/20 | (2013.01) |
| B60R 25/40 | (2013.01) |
| G01D 5/24 | (2006.01) |
| H01Q 1/32 | (2006.01) |
| E05B 81/78 | (2014.01) |
| E05B 85/10 | (2014.01) |

(52) U.S. Cl.
CPC ...... *G07C 9/00706* (2013.01); *B60R 25/2036* (2013.01); *B60R 25/406* (2013.01); *E05B 81/78* (2013.01); *E05B 85/10* (2013.01); *G01D 5/24* (2013.01); *G07C 9/00944* (2013.01); *H01Q 1/3241* (2013.01); *H01Q 1/3283* (2013.01); *G07C 2209/65* (2013.01)

(58) Field of Classification Search
CPC ... B60R 25/00; B60R 25/2036; B60R 25/406; E05B 81/78; E05B 2047/0082; E05B 85/10; H03K 17/955; Y10T 307/852; Y10T 307/826; G07C 9/00706; G07C 9/00944; G07C 2209/65; G01D 5/24; H01Q 1/3241; H01Q 1/3283
USPC ............... 340/5.64; 296/146.1; 307/109, 125
See application file for complete search history.

(56) References Cited

U.S. PATENT DOCUMENTS

| 6,225,710 B1 * | 5/2001 | Palata | ................ H03K 17/955 |
| | | | 307/109 |
| 6,976,726 B2 * | 12/2005 | Hirota | .................... B60R 25/00 |
| | | | 296/146.1 |

FOREIGN PATENT DOCUMENTS

| JP | 5589869 | 9/2014 |
| JP | 5589870 | 9/2014 |

\* cited by examiner

*Primary Examiner* — Ali Neyzari
(74) *Attorney, Agent, or Firm* — Oblon, McClelland, Maier & Neustadt, L.L.P.

(57) ABSTRACT

A vehicle door handle device includes: a detection member including an antenna and a DC driving detection member capable of detecting approach or touch of a person, electrically connected to a driving controller through first and second connection wires and are connected in parallel, wherein the antenna is driven by an AC voltage supplied from the driving controller, the detection member is driven by a DC voltage supplied from the driving controller by respectively connecting the first connection wire and the second connection wire to a positive DC power supply and a ground, the detection member includes a power terminal and a ground terminal, a detection output terminal, an antenna driving detection terminal, and an antenna driving detection unit, and the vehicle door handle device further comprises a DC cut capacitor, and a passive element.

4 Claims, 2 Drawing Sheets

VEHICLE DOOR HANDLE DEVICE

CROSS REFERENCE TO RELATED APPLICATIONS

This application is based on and claims priority under 35 U.S.C. §119 to Japanese Patent Application 2015-123576, filed on Jun. 19, 2015, the entire contents of which are incorporated herein by reference.

TECHNICAL FIELD

The disclosure relates to a vehicle door handle device.

BACKGROUND DISCUSSION

In the related art, for example, a device described in Japanese Patent No. 5589869 (Reference 1) has been known as a vehicle door handle device. The vehicle door handle device uses two electric wires (connection wires) to be connected to an ECU, and these two electric wires are used for the power supply (driving) of an antenna, for the power supply of a detection member, for the outputting of the detection signal, and for the detection of a driving state of the antenna. Particularly, in order to detect the driving state of the antenna, it has been suggested that a resonance voltage of the antenna is used.

In Reference 1, since the resonance voltage is used to detect of the driving state of the antenna, it is necessary to set the resonance voltage to be equal to or less than a rated voltage. Accordingly, it is necessary to increase the size of the antenna as the Q factor of the antenna may not be increased.

SUMMARY

Thus, a need exists for a vehicle door handle device which is not suspectable to the drawback mentioned above.

A vehicle door handle device according to an aspect of this disclosure includes: an antenna and a DC driving detection member that is capable of detecting approach or touch of a person, which are electrically connected to a driving controller through a first connection wire and a second connection wire and are connected in parallel. The antenna is driven by an AC voltage supplied from the driving controller, and the detection member is driven by a DC voltage supplied from the driving controller by respectively connecting the first connection wire and the second connection wire to a positive DC power supply and a ground. The detection member includes a power terminal and a ground terminal that are respectively connected to the first connection wire and the second connection wire, a detection output terminal that is connected to the first connection wire to output a negative detection signal indicating whether or not approach or touch of the person is detected, an antenna driving detection terminal that is connected to the first connection wire, and an antenna driving detection unit that detects a driving state of the antenna based on a voltage input to the antenna driving detection terminal. The vehicle door handle device further includes a DC cut capacitor whose both terminals are respectively connected to the detection output terminal and the antenna driving detection terminal, and a passive element whose both terminals are respectively connected to the antenna driving detection terminal and the ground terminal.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment

Hereinafter, a vehicle door handle device according to a first embodiment will be described. The present embodiment is a smart entry (registered trademark) system that locks and unlocks a vehicle door through wireless communication with a portable device carried by a user of a vehicle.

Figure 1:
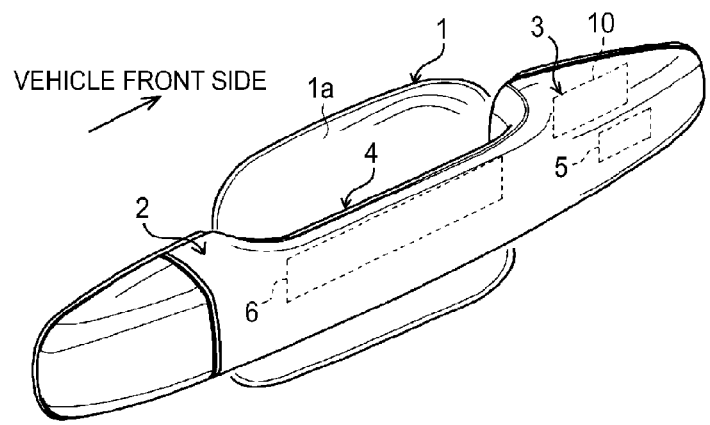
FIG. 1 is a perspective view showing an outside door handle.

As shown in FIG. 1, an outside door handle 2 is provided at a door outer panel 1 constituting the vehicle door. The outside door handle 2 extends in forward and backward directions of the vehicle, and is attached to the door outer panel 1 at two front and rear portions thereof. A recess 1a is inwardly formed in the door outer panel 1 so as to face the outside door handle 2. Thus, it is possible to allow a person to easily hold substantially a central portion of the outside door handle 2 with their hand.

The outside door handle 2 is obtained by molding, for example, a resin material into a hollow shape having an inner space. Detection areas capable of detecting that the person approaches or touches are formed on an outer wall surface of the outside door handle 2. That is, a lock detection area 3 capable of detecting that the hand of the person who intends to lock the vehicle door approaches or touches is formed on an outer wall surface of a front side of the outside door handle 2. An unlock detection area 4 capable of detecting that the hand of the person who intends to unlock the vehicle door approaches or touches is formed on an outer wall surface of an intermediate portion as a holding portion of the outside door handle 2. Within the outside door handle 2, a lock sensor electrode 5 which is made of, for example, a metal plate and has a substantially strip shape is accommodated close to a surface separated from the door outer panel 1 so as to correspond to the lock detection area 3 and an unlock sensor electrode 6 which is made of, for example, a metal plate and has a substantially strip shape is accommodated close to the door outer panel 1 so as to correspond to the unlock detection area 4. The unlock sensor electrode 6 is formed so as to be greater than the lock sensor electrode 5.

Within the outside door handle 2, a module 10 which is electrically connected to the lock sensor electrode 5 and the unlock sensor electrode 6 is accommodated.

Hereinafter, an electrical configuration of the present embodiment will be described.

Figure 2:
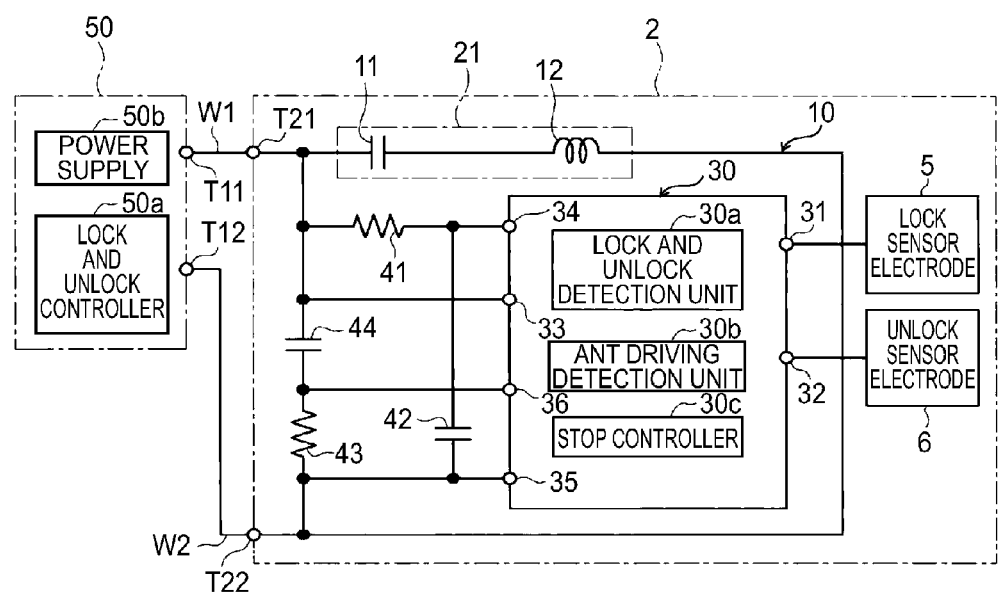
FIG. 2 is a circuit block diagram showing an electrical configuration of a vehicle door handle device according to a first embodiment.

As shown in FIG. 2, a driving ECU 50 as a driving controller is realized using, for example, a microcomputer or an inverter, and a lock and unlock controller 50a and a power supply 50b. The driving ECU 50 is connected to one end of a first electric wire W1 as a first connection wire at a first controller-side terminal T11, and the other end of the first electric wire W1 is connected to a first module-side terminal T21 of the module 10. The driving ECU 50 is connected to one end of a second electric wire W2 as a second connection wire at a second controller-side terminal T12, and the other end of the second electric wire W2 is connected to a second module-side terminal T22 of the module 10. That is, the driving ECU 50 and the module 10 are connected through two wires of the first and second electric wires W1 and W2.

The power supply 50b supplies an AC voltage (square wave voltage) having a frequency matching a resonance frequency f1 to the module 10 through the first and second electric wires W1 and W2. Alternatively, the power supply 50b supplies a DC voltage (battery voltage) to the module 10 through the first and second electric wires W1 and W2 by respectively connecting the first electric wire W1 and the second electric wire W2 to a battery +B as a positive DC power supply and a ground.

In the module 10, an antenna resonance capacitor 11 whose one end is connected to the first module-side terminal T21 is provided, and an antenna coil 12 whose one end is connected to the other end of the antenna resonance capacitor 11 is provided. The other end of the antenna coil 12 is connected to the second module-side terminal T22. The antenna resonance capacitor 11 and the antenna coil 12 constitute an LF antenna 21 as an antenna, and constitute an LC serial resonance circuit having a resonance frequency f1. Accordingly, if an AC voltage (square wave voltage) having a frequency matching the resonance frequency f1 is supplied from the driving ECU 50 through the first and second electric wires W1 and W2, the antenna coil 12 is driven, and a radio signal is output from the antenna coil 12. The radio signal is, for example, an inquiry signal (request signal) of the portable device carried by the user of the vehicle, and the portable device that has received the inquiry signal transmits a signal having a unique ID code.

A sensor IC 30 as a detection member is provided in the module 10. The sensor IC 30 is connected to the lock sensor electrode 5 and the unlock sensor electrode 6 at a lock detection input terminal 31 and an unlock detection input terminal 32, respectively, and is connected to the first module-side terminal T21 at a detection signal output terminal 33 as a detection output terminal.

The sensor IC 30 includes a lock and unlock detection unit 30a constituting a known electrostatic sensor together with the lock sensor electrode 5 or the unlock sensor electrode 6, and supplies power to the lock sensor electrode 5 and the unlock sensor electrode 6 through the lock detection input terminal 31 and the unlock detection input terminal 32 by means of the lock and unlock detection unit 30a. The lock and unlock detection unit 30a detects that the hand of the person approaches or touches the lock detection area 3 or the unlock detection area 4 by respectively detecting electrostatic capacitance changes between the lock sensor electrode 5 and the door outer panel 1 and between the unlock sensor electrode 6 and the door outer panel 1. The lock and unlock detection unit 30a outputs a lock detection signal as a negative detection signal indicating whether or not the detection is performed to the first module-side terminal T21 (first electric wire W1) from the detection signal output terminal 33. Specifically, the lock and unlock detection unit 30a includes a known switching member, and generates and outputs, for example, a lock detection signal and an unlock detection signal by causing voltage drop in the supply voltage of the driving ECU 50 with different cycles.

If the lock detection signal or the unlock detection signal is output to the first controller-side terminal T11 through the first electric wire W1, the lock and unlock controller 50a detects the lock detection signal or the unlock detection signal based on the voltage drop. The lock and unlock controller 50a issues a lock command of the vehicle door by detecting the lock detection signal and issues an unlock command of the vehicle door by detecting the unlock detection signal.

The sensor IC 30 is connected to one end of the resistor 41 at a power terminal 34, and the other end of the resistor 41 is connected to the first module-side terminal T21. The sensor IC 30 is connected to the second module-side terminal T22 at a ground terminal 35. A smoothing capacitor 42 is connected between the power terminal 34 and the ground terminal 35.

Accordingly, for example, if the power supply 50b respectively connects the first electric wire W1 and the second electric wire W2 to the battery +B and the ground, the sensor IC 30 is driven by the DC voltage from the driving ECU 50 by respectively connecting the power terminal 34 and the ground terminal 35 to the battery +B and the ground. Meanwhile, if the power supply 50b supplies the AC voltage (square wave voltage) having the frequency matching the resonance frequency f1 to the LF antenna 21 through the first electric wire W1 and the second electric wire W2, the LF antenna 21 is driven by the AC voltage. In this case, the sensor IC 30 secures power by, for example, accumulated voltage of the smoothing capacitor 42.

That is, the LF antenna 21 and the sensor IC 30 are electrically connected to the driving ECU 50 while being connected in parallel.

The sensor IC 30 is connected to one end of a resistor 43 as a passive element at an antenna driving detection terminal 36, and the other end of the resistor 43 is connected to the ground terminal 35. In the sensor IC 30, a DC cut capacitor 44 is connected between the detection signal output terminal 33 and the antenna driving detection terminal 36 (between a power line and a detection signal output line, and an antenna driving detection line). Accordingly, it is assumed that the AC voltage (square wave voltage) matching the resonance frequency f1 is supplied from the driving ECU 50 through the first and second electric wires W1 and W2 (that is, the LF antenna 21 is driven). In this case, the DC component is removed in the DC cut capacitor 44, and the voltage divided by the DC cut capacitor 44 and the resistor 43 is supplied to the antenna driving detection terminal 36.

The sensor IC 30 includes an antenna driving detection unit 30b, and detects the voltage divided by the DC cut capacitor 44 and the resistor 43 by means of the antenna driving detection unit 30b. The antenna driving detection unit 30b determines whether or not the LF antenna 21 is driving based on a level (root mean square value) of the voltage divided by the DC cut capacitor 44 and the resistor 43. Specifically, the antenna driving detection unit 30b includes, for example, a comparator, and determines that the LF antenna 21 is driving in a case where the level of the voltage exceeds a preset threshold.

The sensor IC 30 includes a stop controller 30c as a stop unit, and obtains the determination result in the antenna driving detection unit 30b by means of the stop controller 30c. In a case where it is determined that the LF antenna 21 is driving, the stop controller 30c stops the function of the sensor IC 30. Specifically, the stop controller 30c transmits a stop command to the lock and unlock detection unit 30a, and stops outputting the detection signal from the detection signal output terminal 33. Alternatively, the stop controller 30c may stop supplying the power to the lock sensor electrode 5 and the unlock sensor electrode 6 by the lock and unlock detection unit 30a. Alternatively, the stop controller 30c may stop the entire function of the lock and unlock detection unit 30a.

In a case where it is determined that the LF antenna 21 is not driven by the antenna driving detection unit 30b, the stop controller 30c releases the function stoppage of the sensor IC 30 (resumes the function of the sensor IC 30).

As stated above, according to the present embodiment, the following effects can be obtained.

(1) In the present embodiment, the antenna driving detection terminal 36 is connected to the first electric wire W1 (power terminal 34) through the DC cut capacitor 44, and is connected to the second electric wire W2 (ground terminal 35) through the resistor 43. Accordingly, for example, for a period during which the sensor IC 30 is driven (that is, the LF antenna 21 is not driven), the voltage supplied to the antenna driving detection terminal 36 becomes zero. Therefore, if the lock detection signal or the unlock detection signal (detection signal) is output from the detection signal output terminal 33, the detection signal is output to the first electric wire W1 in a state in which the detection signal is blocked from flowing to the ground by the DC cut capacitor 44. The lock and unlock controller 50a (driving ECU 50) can appropriately input the lock detection signal or the unlock detection signal. That is, the lock and unlock controller 50a can appropriately issue a lock or unlock command of the vehicle door based on the lock or unlock detection signal.

Meanwhile, for a period during which the LF antenna 21 is driven (that is, for a period during which the sensor IC 30 is not driven), the AC voltage (square wave voltage) having the resonance frequency f1 of the LF antenna 21 is output to the first electric wire W1 and the second electric wire W2 from the driving ECU 50. In this case, the AC current basically flows to the LF antenna 21, but a part thereof flows to the DC cut capacitor 44 and the resistor 43. Accordingly, the AC current flows to the DC cut capacitor 44 and the resistor 43, and thus, as much of the voltage as the voltage drop in the resistor 43 is supplied to the antenna driving detection terminal 36. Therefore, the antenna driving detection unit 30b can appropriately detect a driving state of the LF antenna 21. In this case, particularly, the resonance voltage can be set without being restricted to the rated voltage of the antenna driving detection unit 30b (sensor IC 30) by detecting the driving state of the LF antenna 21 without using the resonance voltage especially for a period during which the LF antenna 21 is driven. Thus, the size of the LF antenna 21 can be further reduced as the Q factor of the LF antenna 21 increases.

It is possible to further improve mountability thereof as the size of the LF antenna 21 is reduced. Alternatively, since it is not necessary to increase the size of the LF antenna 21, adopt the antenna driving detection unit 30b (sensor IC 30) having a high rated voltage, or separately provide a circuit element (for example, a diode having a high breakdown voltage) for using the resonance voltage, it is possible to achieve low cost.

The resonance voltage can be increased without being restricted to the rated voltage of the sensor IC 30, and thus, it is possible to increase the output of the LF antenna 21.

(2) In the present embodiment, the resistor 41 whose both terminals are respectively connected to the power terminal 34 and the detection signal output terminal 33 (that is, which is provided with the power line) is provided. Accordingly, for a period during which the lock detection signal or the unlock detection signal (detection signal) is output, it is possible to suppress the drawing of electric charges from the smoothing capacitor 42 by the resistor 41. Alternatively, for a period during which the LF antenna 21 is driven, it is possible to prevent the electric charges from flowing to the smoothing capacitor 42 by the resistor 41.

(3) In the present embodiment, when the driving state of the LF antenna 21 is detected by the antenna driving detection unit 30b, the function of the sensor IC 30 is stopped by the stop controller 30c. Therefore, the sensor IC 30 does not simultaneously perform a detection operation for a period during which the LF antenna 21 is driven. For a period during which the LF antenna 21 is driven, since the sensor IC 30 does not output the lock detection signal or the unlock detection signal, it is possible to reduce the possibility that misdetection will occur due to the superimposition of the detection signal onto the first electric wire W1. It is possible to reduce the power consumption of the sensor IC 30 in the driving state of the LF antenna 21.

(4) In the present embodiment, by driving the LF antenna 21 and the sensor IC 30 by using two common wires of the first and second electric wires W1 and W2, it is possible to further simplify the circuit configuration of the entire device, and it is possible to achieve low cost. Alternatively, the passage for supplying the power to the sensor IC 30 for a period during which the LF antenna 21 is driven and the passage for supplying the power for a period during which the sensor IC 30 is driven are used in common, and thus, it is possible to further simplify the circuit configuration of the module 10 (outside door handle 2) and it is possible to achieve low cost.

Second Embodiment

Hereinafter, a vehicle door handle device according to a second embodiment will be described. The second embodiment is different from the first embodiment in that diodes of suppressing the application of a negative voltage to the sensor IC are provided, and thus, the detailed description of the same components will be omitted.

Figure 3:
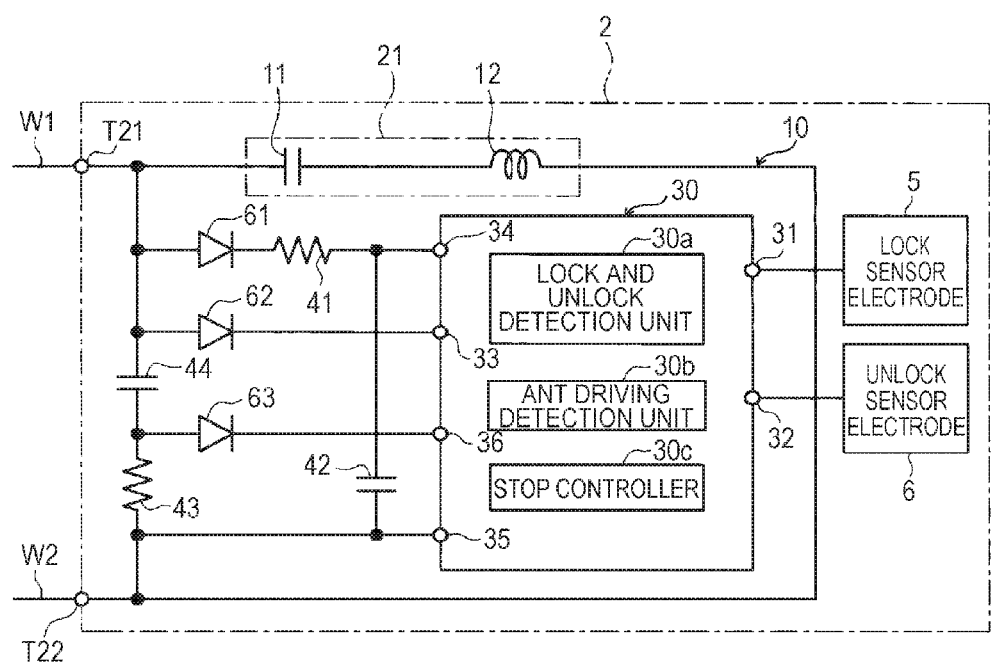
FIG. 3 is a circuit block diagram showing an electrical configuration of a vehicle door handle device according to a second embodiment.

As shown in FIG. 3, the module 10 of the present embodiment includes a diode 61 whose anode is connected to the first module-side terminal T21 (first electric wire W1) and whose cathode is connected to the power terminal 34 through the resistor 41. The module includes a diode 62 whose anode is connected to the first module-side terminal T21 (first electric wire W1) and whose cathode is connected to the detection signal output terminal 33. The module includes a diode 63 whose anode is connected to the first module-side terminal T21 (first electric wire W1) and whose cathode is connected to the antenna driving detection terminal 36.

Thus, according to the present embodiment, the following effects are obtained in addition to the same effects as those of the first embodiment.

(1) In the present embodiment, for a period during which the LF antenna 21 is driven, it is possible to suppress the application of a negative voltage to the power terminal 34 (sensor IC 30) by the diode 61 provided at a power line. For a period during which the LF antenna 21 is driven, it is possible to suppress the application of a negative voltage to the detection signal output terminal 33 (sensor IC 30) by the diode 62 provided at a detection signal output line. In addition, for a period during which the LF antenna 21 is driven, it is possible to suppress the application of a negative voltage to the antenna driving detection terminal 36 (sensor IC 30) by the diode 63 provided at an antenna driving detection line.

(2) In the present embodiment, for a period during which the lock detection signal or the unlock detection signal (detection signal) from the detection signal output terminal 33 is output, it is possible to suppress the drawing of electric charges from the smoothing capacitor 42 by the diode 61.

The above-described embodiments may be changed as follows.

In the first embodiment, for a period during which the LF antenna 21 is driven, a DC bias may be set (for example, charged up due to the booster capacitor) to the AC voltage (square wave voltage) such that the negative voltage is not applied to the sensor IC 30. Alternatively, the negative voltage is not applied to the sensor IC 30 if the AC voltage (square wave voltage) is generated in an inverter realized using a so-called half bridge circuit.

In the second embodiment, any one of the diodes 61 to 63 may be omitted.

In the respective embodiments, even after the driving state of the LF antenna 21 is detected by the antenna driving detection unit 30*b*, the function of the sensor IC 30 may be maintained. That is, the stop controller 30*c* of the sensor IC 30 may be omitted.

In the respective embodiments, the resistor 41 may be omitted.

In the respective embodiments, the resistor 43 may be replaced with a capacitor or an inductance as long as an element (passive element) that causes impedance is used.

In the respective embodiments, the frequency (that is, resonance frequency f1) and the duty ratio of the square wave voltage for a period during which the LF antenna 21 is driven may be arbitrary.

In the respective embodiments, the lock detection signal or the unlock detection signal (detection signal) may be continuously output for a predetermined period (for example, a period during which it is detected that the person approaches or touches).

In the respective embodiments, the lock detection signal and the unlock detection signal may be identified due to different voltage levels from each other.

In the respective embodiments, the lock detection signal or the unlock detection signal (detection signal) may adopt an arbitrary output system such as code, voltage, or current.

In the respective embodiments, the arrangement of the lock detection area 3 and the unlock detection area 4 in the outside door handle 2 and the arrangement and shape of the lock sensor electrode 5 and the unlock sensor electrode 6 corresponding thereto may be appropriately changed.

In the respective embodiments, any one function of the function of detecting that the hand of the person approaches or touches the lock detection area 3 by the lock and unlock detection unit 30*a* and the function of detecting that the hand of the person approaches or touches the unlock detection area 4 may be omitted.

In the respective embodiments, the sensor IC 30 may detect that the person approaches or touches by using one or combinations of contact sensors or proximity sensors such as an electrostatic sensor, a shock sensor, a pyroelectric sensor, a pressure sensor, an infrared sensor, and RFID.

In the respective embodiments, the sensor IC 30 may be manufactured using a microcomputer and an analog element such as a regulator or a transistor.

In the respective embodiments, the radio signal output from the LF antenna 21 may be obtained by performing an AM modulation scheme on information, or may be obtained by performing an FM modulation scheme on information.

In the respective embodiments, the module 10 may be provided within a vehicle door, a doorknob, a pillar, a side mirror, or a vehicle compartment.

The embodiments disclosed herein may be applied to a so-called tire-pressure monitoring system (TPMS) that detects an air pressure or temperature of a tire through wireless communication with a sensor provided within a tire or a wheel of the vehicle.

A vehicle door handle device according to an aspect of this disclosure includes: an antenna and a DC driving detection member that is capable of detecting approach or touch of a person, which are electrically connected to a driving controller through a first connection wire and a second connection wire and are connected in parallel. The antenna is driven by an AC voltage supplied from the driving controller, and the detection member is driven by a DC voltage supplied from the driving controller by respectively connecting the first connection wire and the second connection wire to a positive DC power supply and a ground. The detection member includes a power terminal and a ground terminal that are respectively connected to the first connection wire and the second connection wire, a detection output terminal that is connected to the first connection wire to output a negative detection signal indicating whether or not approach or touch of the person is detected, an antenna driving detection terminal that is connected to the first connection wire, and an antenna driving detection unit that detects a driving state of the antenna based on a voltage input to the antenna driving detection terminal. The vehicle door handle device further includes a DC cut capacitor whose both terminals are respectively connected to the detection output terminal and the antenna driving detection terminal, and a passive element whose both terminals are respectively connected to the detection output terminal and the ground terminal.

According to this configuration, the antenna driving detection terminal is connected to the first connection wire (power terminal) through the DC cut capacitor, and is connected to the second connection wire (ground terminal) through the passive element. Accordingly, for example, for a period during which the direction member is driven (that is, for a period during which the antenna is not driven), a voltage supplied to the antenna driving detection terminal becomes zero. Therefore, if the detection signal is output in this state, the detection signal is output to the first connection wire in a state in which the detection signal is blocked from flowing to the ground by the DC cut capacitor. The driving controller can appropriately input the detection signal.

Meanwhile, for a period during which the antenna is driven (that is, the detection member is not driven), the AC voltage is output to the first connection wire and the second connection wire from the driving controller. In this case, the AC current basically flows to the antenna side, but a part thereof flows to the DC cut capacitor and the passive element. Accordingly, the AC current flows the DC cut capacitor and the passive element, and thus, as much of the voltage as the voltage drop in the passive element is supplied to the antenna driving detection terminal. Therefore, the antenna driving detection unit can appropriately detect the driving state of the antenna. In this case, the driving state of the antenna can be detected without using the resonance voltage especially for a period during which the antenna is driven, and thus, the resonance voltage can be set without being restricted to the rated voltage of the antenna driving detection unit (detection member). Thus, it is possible to reduce the size of the antenna as the Q factor of the antenna increases.

It is preferable that the vehicle door handle device further includes a smoothing capacitor whose both terminals are respectively connected to the power terminal and the ground terminal, and a resistor whose both terminals are respectively connected to the power terminal and the detection output terminal.

According to this configuration, for a period during which the detection signal is output, it is possible to suppress the drawing of electric charges from the smoothing capacitor by the resistor. Alternatively, for a period during which the antenna is driven, it is possible to suppress the flowing of the electric charges to the smoothing capacitor by the resistor.

It is preferable that the vehicle door handle device further includes at least one of a diode whose anode is connected to the first connection wire and whose cathode is connected to the power terminal, a diode whose anode is connected to the first connection wire and whose cathode is connected to the detection output terminal, and a diode whose anode is connected to the first connection wire and whose cathode is connected to the antenna driving detection terminal.

According to this configuration, for a period during which the antenna is driven, it is possible to suppress the application of a negative voltage to the detection member by the diode.

It is preferable that the vehicle door handle device further includes a stop unit which stops the function of the detection member when a driving state of the antenna is detected by the antenna driving detection unit.

According to this configuration, when the driving state of the antenna is detected, the function of the detection member is stopped by the stop unit. Accordingly, the detection member simultaneously does not perform a detection operation for a period during which the antenna is driven. Since the detection member does not output the detection signal for a period during which the antenna is driven, it is possible to reduce possibility that misdetection will occur due to the superimposition of the detection signal onto the first connection wire.

According to the aspect of this disclosure, an effect of further reducing the size of the antenna is exhibited.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle door handle device comprising:
a detection member including an antenna and a DC driving detection member that is capable of detecting approach or touch of a person, which are electrically connected to a driving controller through a first connection wire and a second connection wire and are connected in parallel,
wherein the antenna is driven by an AC voltage supplied from the driving controller,
the detection member is driven by a DC voltage supplied from the driving controller by respectively connecting the first connection wire the second connection wire to a positive DC power supply and aground,
the detection member includes
a power terminal and a ground terminal that are respectively connected to the first connection wire and the second connection wire,
a detection output terminal that is connected to the first connection wire to output a negative detection signal indicating whether or not approach or touch of the person is detected,
an antenna driving detection terminal that is connected to the first connection wire, and
an antenna driving detection unit that detects a driving state of the antenna based on a voltage input to the antenna driving detection terminal, and the vehicle door handle device further comprises
a DC cut capacitor including a first DC cut capacitor terminal connected to the detection output terminal and including a second DC cut capacitor terminal connected to the antenna driving detection terminal, and
a passive element including a first passive element terminal connected to the antenna driving detection terminal and including a second passive element terminal connected to the ground terminal.

2. The vehicle door handle device according to claim 1, further comprising:
a smoothing capacitor including a first smoothing capacitor terminal connected to the power terminal and including a second smoothing capacitor terminal connected to the ground terminal; and
a resistor including a first resistor terminal connected to the power terminal and including a second resistor terminal connected to the detection output terminal.

3. The vehicle door handle device according to claim 1, further comprising:
at least one of:
a diode including an anode connected to the first connection wire and including a cathode connected to the power terminal,
a diode including an anode connected to the first connection wire and including a cathode connected to the detection output terminal, and
a diode including an anode connected to the first connection wire and including a cathode connected to the antenna driving detection terminal.

4. The vehicle door handle device according to claim 1, further comprising:
a stop unit that stops the function of the detection member when a driving state of the antenna is detected by the antenna driving detection unit.

* * * * *